United States Patent [19]

Pianka et al.

[11] 3,715,384
[45] Feb. 6, 1973

[54] PESTICIDAL ESTERS OF 2,6-DINITRO-4-ALKYL PHENOLS

[76] Inventors: Max Pianka, 67 Sandpit Lane, St. Albans, Hertfordshire; John Duncan Edwards, 60 Reginald Street, Luton, Bedfordshire, both of England

[22] Filed: Aug. 27, 1970

[21] Appl. No.: 67,583

Related U.S. Application Data

[63] Continuation of Ser. No. 707,880, Feb. 23, 1968, abandoned, which is a continuation of Ser. No. 476,706, Aug. 2, 1965, abandoned.

[52] U.S. Cl. ...260/479 R, 260/247.7 C, 260/293.84, 260/404.5, 260/476 R, 260/479 S, 260/567.5, 260/612 D, 260/622 P, 260/624 E, 424/308, 424/317
[51] Int. Cl. ....C07c 69/24, C07c 69/52, C07c 69/78
[58] Field of Search ......................260/476 R, 479 R

[56] References Cited

UNITED STATES PATENTS

| | | | |
|---|---|---|---|
| 2,526,660 | 10/1950 | Hester et al. | 260/479 |
| 2,861,915 | 11/1958 | Cary | 260/479 |
| 2,862,022 | 11/1958 | Cook et al. | 260/479 |

OTHER PUBLICATIONS

Clarke et al., Jour. Chem. Soc. (London), 1962, pages 519–521

*Primary Examiner*—James A. Patten
*Attorney*—Bacon & Thomas

[57] ABSTRACT

Fungicidal compounds useful for the control of plant mildews are 4-alkyl-2,6-dinitrophenyl esters wherein the 4-alkyl group is selected from 1-ethyl-n-hexyl, 1-n-propyl-n-hexyl, 1-n-butyl-n-hexyl, 1-n-pentyl-n-hexyl, 1-ethyl-n-pentyl, 1-n-propyl-n-pentyl, 1-n-butyl-n-pentyl and 1-n-propyl-n-butyl.

13 Claims, No Drawings

PESTICIDAL ESTERS OF 2,6-DINITRO-4-ALKYL PHENOLS

This is a continuation of Ser. No. 707,880, filed Feb. 23, 1968, which in turn is a continuation of Ser. No. 476,706, filed Aug. 2, 1965, both now abandoned.

This invention is concerned with improvements in or relating to pesticides.

The present invention provides a group of esters of 2,6-dinitro-4-alkyl phenols having certain specific 4-alkyl groups, which esters have particularly good mildewicidal activity and also low phytotoxicity. These esters have a generally lower phytotoxicity than the corresponding parent 2,6-dinitro-4-alkyl phenols.

According to the present invention there are provided compounds of the general formula:-

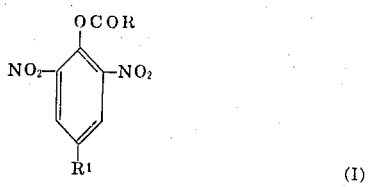

(I)

where either (A):

R represents a saturated or unsaturated aliphatic group which may be substituted with one or more of the following substitutents; halogen atoms, carboxy groups, alkoxy groups and alkoxycarbonyl groups or R represents a phenyl group or a halophenyl group, and $R^1$ represents 1-n-propyl-n-hexyl; 1-n-butyl-n-hexyl; 1-n-pentyl-n-hexyl; 1-ethyl-n-pentyl; 1-n-propyl-n-pentyl; 1-n-butyl-n-pentyl or 1-n-propyl-n-butyl; or (B):

R represents an alkyl group, a halo-alkyl group, a phenyl group, a halo-phenyl group, or the group having the general formula:

(II)

where $R^5$ represents hydrogen or an alkyl group and $R^6$ and $R^7$ are the same and both represent hydrogen or alkyl groups, or $R^6$ represents hydrogen and $R^7$ represents an alkoxy-carbonyl group, and $R^1$ represents 1-ethyl-n-hexyl.

R may thus for example, both under (A) and (B), be a branched or unbranched $\alpha,\beta$ unsaturated aliphatic group e.g., an $\alpha$- or $\beta$-alkyl vinyl group such as an $\alpha$-methyl vinyl group, a $\beta,\beta$-dimethyl vinyl group or a $\beta$-methoxy-carbonyl vinyl group. R may also in both cases be an alkyl group, for example one containing from one to ten carbon atoms such as methyl, ethyl, propyl, hexyl, octyl or decyl group, or a haloalkyl group especially a chloroalkyl group containing from one to ten carbon atoms.

Various methods have been proposed for the preparation of dinitro derivatives of hydrocarbon-substituted phenols but in many cases the products were mixtures of isomers. These mixtures included both position isomers and also isomers of the hydrocarbon side chain. Therefore, whichever method is adapted to prepare the alkyl phenols and their dinitro derivatives which are used to prepare the esters of the present invention, care should be taken to ensure that the desired compound is obtained.

The compounds according to the invention can be prepared from the corresponding 4-branched alkyl 2,6-dinitrophenols in any convenient manner.

A preferred method for preparing the compounds of the invention comprises reacting a phenol of the general formula:

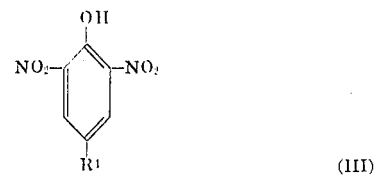

(III)

where $R^1$ has any of the meanings given above, or a functional derivative of said phenol, with an acylating derivative of an acid of the general formula:

R.COOH (IV)

where R has any of the meanings given above.

By a functional derivative of the phenol we mean such derivatives as alkali metal phenoxides which react with reagents such as acid halides to give the same product as does the parent phenol. The acylating derivative may be an anhydride or a halide such as a chloride or bromide. Where a phenol is used the reaction is preferably carried out in the presence of an acid binding agent, e.g., a tertiary base such as pyridine or dimethylaniline. The reaction is conveniently effected in the presence of an inert organic solvent such as diethyl ether, benzene or tetrahydrofuran.

In practice an alkali metal (e.g. sodium or potassium) phenoxide is conveniently used as a functional derivative of the phenol and a halide of the acid is reacted with the phenoxide in solution in inert organic solvent.

The phenoxide is preferably formed by reaction of an alkali metal hydroxide or a salt of an alkali metal and a weak acid with a solution of the 4-alkyl-2,6-dinitrophenol of formula (III) in an inert organic solvent, the latter also being a solvent for the phenoxide.

The 4-alkyl-2,6-dinitrophenol of formula (III) is prepared by any convenient method, for example as described below.

Instead of using a performed alkali metal phenoxide the reaction may be effected by simultaneously reacting the carboxylic acid halide, 4-alkyl-2,6-dinitrophenol and alkali metal hydroxide or salt of an alkali metal and a weak acid in an inert organic solvent in which the alkali metal phenoxide is soluble.

Suitable solvents include ketones, preferably lower alkyl ketones e.g., acetone, methyl ethyl ketone etc. The suitability of any solvent can be determined by preliminary experiment with a specimen of the alkali metal phenoxide. Sodium and potassium are preferred alkali metals.

The alkali metal compound used is preferably an alkali metal carbonate e.g., potassium carbonate or sodium carbonate.

The reactants are preferably used in substantially stoichiometrical quantities to avoid contamination of the resulting ester with impurities.

Reaction of the carboxylic acid halide with the phenoxide or mixture of the phenol and alkali metal compound is conveniently effected at a temperature between 35° and 100°C., advantageously at the boiling point of the solvent used.

After the reaction is complete the reaction mixture is allowed to cool, precipitated alkali metal halide is filtered off and the solvent is removed under reduced pressure. Any contaminants in the resulting ester may be removed by washing e.g., with dilute alkali and water.

The esterification reaction using an alkali metal phenoxide not only enables good yields of the desired ester to be obtained but also avoids the use of tertiary organic bases, e.g., pyridine. This preferred process is thus more economic.

The parent dinitro-alkyl phenols:-

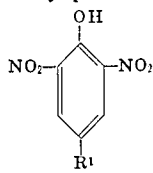

(III)

where $R^1$ has any of the meanings given above may conveniently be prepared by dinitration of the corresponding alkylphenols. This dinitration may be carried out by an convenient method. However, a preferred method comprises adding the 4-alkyl phenol in solution in an inert organic solvent, particularly a hydrocarbon or a halogenated hydrocarbon solvent, to agitated aqueous nitric acid containing at least two equivalents of nitric acid; on completion of the addition raising the temperature of the reaction mixture to further the nitration; cooling the reaction mixture when the reaction is essentially complete and recovering the nitrated phenol.

The 4-alkylphenol may be dissolved in any desired inert organic solvent. However, it is convenient to use halogenated hydrocarbons, e.g., halogenated alkanes, in order to decrease the fire risk. Suitable solvents are thus ethylene dichloride and especially carbon tetrachloride.

In order to obtain the nitrated phenol it is necessary to use at least two equivalents of nitric acid and it is preferred to use from three to eight equivalents, preferably about 4 equivalents, in order to obtain optimum results. Moreover, it is preferred to employ aqueous nitric acid in which the concentration of nitric acid is initially from 6 N. to 10 N. The production of nitric acid of this concentration from commercial concentrated nitric acid and water involves the liberation of heat and it is desirable not to allow the temperature to exceed 35°C. while the 4-alkylphenol solution is being added. After the addition is complete the temperature is then raised to further the nitration. Whilst temperature of 40°–49°C. may be employed, it has been found that a significant increase in purity may be obtained by completing the nitration reaction between 50°C. and the boiling point of the reaction mixture. Indeed products of high purity are obtained by boiling the reaction mixture preferably under reflux.

When the nitration is to all practical purposes complete, the reaction mixture is cooled and the nitrated phenol recovered therefrom. This may be achieved by allowing the mixture to separate into two phases, discarding the aqueous phase and repeatedly washing the organic phase until the washings have pH circa 4. The solvent may then be removed under reduced pressure leaving the oily 4-alkyl-2,6-dinitrophenol.

Alkyl phenols analogous to those used to prepare the esters of the present invention have been prepared by reacting phenol with an alkylating agent e.g., an alkene or a mixture of an alkanol and a dehydrating agent. Using this process the alkylated product is a mixture of 2- and 4-alkyl phenols and further, a mixture of alkyl side chain isomers. To obtain substantially pure 4-alkyl phenol having the desired side chain structure it is necessary to fractionate the mixture e.g., by distillation before or after nitration.

One method of preparing the 4-alkyl phenols involves reacting a p-hydroxybenzoketone with an appropriate alkylmagnesium halide, to yield a tertiary carbinol, dehydration of the carbinol, followed by catalytic hydrogenation of the resultant olefin e.g., using palladium/charcoal in ethanol. Dehydration may occur spontaneously during heating or may be effected by the use of an acid catalyst e.g., potassium hydrogen sulphate, p-toluene sulphonic acid or sulphuric acid. Such a procedure ensures that the 4-alkyl group is branched in the precise manner desired. In some cases it may be advantageous to use the methyl ether of the benzoketone to improve solubility in the reaction solvent and/or to avoid side reactions, demethylation being carried out after reduction of the olefin.

The compounds according to the invention may be formulated for use in any desired way. Generally such formulations will include at least one such compound in association with a suitable carrier or diluent. If desired, there may be used in addition to such compound(s) one or more further pesticides e.g., other fungicides, acaricides or insecticides. Such carriers may be liquid or solid and designated to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc.; in such cases the carrier is a solvent or emulsion base which is non-phytotoxic under the conditions of use. Generally such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating compositions wherein the compound is associated with a solid pyrotechnic component.

In order that the invention may be well understood the following examples are given by way of illustration only:

PREPARATION OF ALKYL PHENOLS

The preparations of alkyl phenols was carried out as described above using an alkyl magnesium halide and a hydroxyphenylketone or methoxyphenylketone followed by treatment with potassium hydrogen sulphate to give an olefin and reduction of the olefin by hydrogenation using palladium/charcoal in ethanol. Where it is necessary to use the anisole derivatives, methylation was carried out in a conventional manner using dimethylsulphate on the hydroxy ketone. The final demethylation was effected by heating with hydrobromic acid in acetic acid to give the phenol.

A typical preparation of an alkyl phenol is as follows:

PREPARATION OF 4-(1-n-propyl-n-butyl)phenol

1. Preparation of 4-(1-n-propyl-n-butenyl)anisole n-Propyl bromide (42 g.) in sodium-dried ether (50 ml.) was added dropwise to magnesium (7.0g.) covered with sodium-dried ether (100 ml.) at such a rate as to maintain a vigorous reflux. After the addition the reflux was maintained for a further 1½ hr., then p-methoxy-n-butyrophenone (45 g.) in sodium-dried ether (40 ml.) was added dropwise with stirring at a rate sufficient to maintain the reflux. After the addition the reaction mixture was heated under reflux for 3 hr., then cooled and poured onto crushed ice, and acidified with an excess of dilute sulphuric acid. The ether layer was separated, washed with water and distilled on a steam-bath at 20 mm. Concentrated sulphuric acid (9 drops) was added to the residue from the distillation, which was then heated at about 50°C. overnight. Ether and dilute sodium hydroxide were added to the cooled mixture and the ether solution was separated, washed with water and dried over sodium sulphate. The dried solution was filtered and distilled to give 4-(1-n-propyl-n-butenyl)anisole (41.9 g., 81 percent) b.p. 145°–150 °C./17 mm., $n_D^{20}$ 1.5239 (Found: C, 82.08; H, 9.87. $C_{14}H_{20}O$ requires C, 82.35; H, 9.80%).

2. Preparation of 4-(1-n-propyl-n-butyl)anisole 4-(1-n-Propyl-n-butenyl)anisole (41 g.) in absolute alcohol (25 ml.) was added to a suspension of a 10 percent palladium on charcoal catalyst (2 g.) in absolute alcohol (25 ml.) and the mixture hydrogenated at about atmospheric pressure. When the hydrogen uptake has ceased, the catalyst was filtered off and the filtrate distilled to give 4-(1-n-propyl-n-butyl)-anisole (37.1 g., 90 percent) b.p. 139°–143°C./15 mm. $n_D^{20}$ 1.4950 (Found: C, 81.42; H, 10.61 $C_{14}H_{22}O$ requires C, 81.55; H, 10.68 percent).

3. Demethylation of 4-(1-n-propyl-n-butyl)anisole to give 4-(1-n-propyl-n-butyl)-phenol 4-(1-n-Propyl-n-butyl)anisole (36 g.) was dissolved in a mixture of glacial acetic acid (250 ml.) and 47 percent aqueous hydrobromic acid (160.8 g.). The mixture was heated under reflux for 11 hr., cooled and extracted with light petroleum (b.p. 40°–60°C., 2 portions, 100 ml., 50 ml.). The petroleum solution was washed with water, then with 2 portions (100 mls.) of a mixture of 25 percent w/v aqueous NaOH (50 ml.) and methanol (50 ml.). The combined alkaline extracts were washed with light petroleum (b.p. 40°–60°C., 100 ml.), then acidified with concentrated hydrochloric acid. The liberated phenol was extracted with petroleum (b.p. 40°–60°C., 2 portions, 100 ml., 50ml) and the petroleum solution was washed with water, dried ($Na_2SO_4$) and distilled to give 4-(1-n-propyl-n-butyl)-phenol (31,35 g., 93.4 percent) b.p. 156°–160°C. (mainly 158°–159°C.)/19 mm., solidifying to needless m.p. 61°–64°C. (softening at 57°C). (Found: C, 81.17; H, 10.35. $C_{13}H_{20}O$ requires C, 81.25; H, 10.42 percent).

A further typical example of the preparation of an alkyl phenol is now given with reference to the preparation of pure 2,6-dinitro-4-(1-ethyl-n-hexyl)phenol from a crude nitration product of technical caprylphenol.

a. Isolation of the cyclohexylamine salts of 2,6-dinitro-4-(1-ethyl-n-hexyl)phenol and 2,4-dinitro-6-(1-methyl heptyl)phenol To the crude nitration product of technical caprylphenol (2 kg) prepared by reacting capryl alcohol and phenol in the presence of sulphuric acid which is in fact a mixture of 2-and 4-octylphenols) dissolved in petrol, (b.p. 60° – 80°) (4 liters) and cooled in a mixture of ice and water, cyclohexylamine (480 g) was added below 40° over 25 min. while stirring. The mixture was stirred until it reached room temperature, then the solid salt was filtered off, washed with petrol (b.p. 60° – 80°C), stirred with more petrol, filtered again, and washed again with petrol. The solid was then dissolved at reflux in ethyl acetate (1 liter), and petrol (b.p. 60° – 80°) (200 c.c.) was added under reflux until the solution became turbid. It was then allowed to cool slowly.

The first crop of crystals that precipitated out was then filtered off and washed with petrol. It weighted 724 g. and melted at 145° – 147°. A second crop was obtained by concentrating the filtrate. This solid was of an orange color and melted at 123° – 126°C.

The first crop was then recrystallized again from a mixture of isopropanol and di-isopropyl ether. The cyclohexylamine salt of 2,4-dinitro-6-(1-methyl-n-heptyl)phenol was obtained as bright yellow prisms, m.p. 151° – 151.5°.

The second crop, consisting of an orange colored solid, m.p. 123°–126° obtained as mentioned above by concentrating the filtrate, was further purified by recrystallizing from a mixture of isopropanol (twice the weight of solid) and di-isopropyl ether (4 times the weight of solid). The cyclohexylamine salt of 2,6-dinitro-4-(1-ethyl-n-hexyl)phenol was obtained as bright orange-colored needles, m.p. 163°–164.5°.

b. 2,6-Dinitro-4-(1-ethyl-n-hexyl)phenol from the cyclohexylamine salt

The cyclohexylamine salt of 2,6-dinitro-4-(1-ethyl-n-hexyl)phenol was suspended in petrol (b.p. 60° – 80°C) 2 liters), stirred and refluxed. A solution of an equal weight of concentrated hydrochloric acid (37% w/w) in twice the weight of water was then added. The mixture was refluxed for 3 hours with stirring, cooled, the petrol layer separated, washed with water, dried over anhydrous sodium sulphate and the solvent distilled off first at atmospheric pressure, then at 100° and 0.5 mm for 2 hours. 2,6-Dinitro-4-(1-ethyl-n-hexyl)phenol was obtained as a yellow oil, $n_D^{22}$ 1.5465 (Found: N, 9.8. $C_{14}H_{20}N_2O_5$ requires N, 9.5%).

The following salts of 2,6-dinitro-4-(1-ethyl-n-hexyl) phenol were prepared

| Salt | Recrystallization solvents | M.p. |
| --- | --- | --- |
| Morpholine (orange plates) | a mixture of ligroin and benzene, then di-isopropyl ether | 124°–125° |
| Piperidine (orange plates) | ligroin, then petrol (b.p. 60°– 80°) | 112°–113° |

Table I give the characteristics of the resulting 4-alkyl phenols.

TABLE I

| 4-Alkyl substituent of the phenol | B.p. | Refractive index $n_D$ | Empirical Formula | Analysis Found % C H | Required % C H |
|---|---|---|---|---|---|
| 1-n-propyl-n-butyl | 158–159 19 mm | solid m.p. 61–64°C | $C_{13}H_{20}O$ | 81.17 10.35 | 81.25 10.42 |
| 1-ethyl-n-pentyl | 154–155 15 mm | 1.5105 (17) | $C_{13}H_{20}O$ | 81.33 10.15 | 81.25 10.42 |
| 1-n-propyl-n-pentyl | 124–125 1.8 mm | Solid m.p. 36–37°C | $C_{14}H_{22}O$ | 81.84 10.97 | 81.55 10.68 |
| 1-n-butyl-n-pentyl | 180 20 mm | solid m.p. 55°C | $C_{15}H_{24}O$ | 81.06 10.93 | 81.82 10.91 |
| 1-ethyl-n-hexyl | 153–154 10 mm | 1.5070 (18) | $C_{14}H_{22}O$ | 79.16 10.25 | 81.55 10.68 |
| 1-n-propyl-n-hexyl | 167 12 mm | 1.5028 (21) | $C_{15}H_{24}O$ | 81.61 10.88 | 81.81 10.91 |
| 1-n-butyl-n-hexyl | 186–187 11 mm | 1.5008 (20) | $C_{16}H_{26}O$ | 82.05 10.92 | 82.06 11.11 |
| 1-n-pentyl-n-hexyl | 131.5–132 0.45 mm | 1.5017 (20) | $C_{17}H_{28}O$ | 81.87 10.77 | 82.24 11.29 |

B. Preparation of dinitroalkylphenols Preparation of 4-(1-n-propyl-n-hexyl)-2,6-dinitrophenol To 4-(1-n-propyl-n-hexyl)-phenol (19.2 g.) in ethylene dichloride (34.1 ml.) a mixture of conc. nitric acid (69–72% $HNO_3$; 22.5 ml.) and water (22.5 ml.) was added. The mixture was heated under reflux for 1½ hr. The ethylene dichloride layer was separated off, washed with saturated aqueous sodium sulphate solution, dried over anhydrous sodium sulphate and filtered. The ethylene dichloride was removed from the dried solution. The residue was dissolved in light petroleum (b.p. 40°–60°, 125 ml.). Cyclohexylamine (15 ml.) was added and the mixture refrigerated. The orange colored crystals that separated were filtered off (24 g.), m.p. 162°–164°. After recrystallization from 33 percent aqueous isopropanol the salt had m.p. 165°–166° (20.7 g.). It was dissolved in methanol and the solution acidified with conc. hydrochloric acid. The mixture was diluted with water and the brown oil that precipitated was extracted with light petroleum, b.p. 60°–80. The petroleum extract was washed with water, dried over anhydrous sodium sulphate, filtered, the petroleum was removed from the filtrate. 4-(1-n-Propyl-n-hexyl)-2,6-dinitrophenol was obtained as an oil (14.9 g.).

Table II shows the physical characteristics of this and other dinitroalkyl phenols also prepared via their cyclohexylamine salts.

TABLE II

| 4-alkyl substituent of the 2,6-dinitrophenol | M.p. of cyclohexylamine salt,* degrees | Refractive index of phenol | Empirical formula | Found, N percent | Required, N percent |
|---|---|---|---|---|---|
| 1-n-propyl-n-butyl | 197–199 | $n_D^{20}$ 1.5528 | $C_{13}H_{18}N_2O_5$ | 9.8 | 9.9 |
| 1-ethyl-n-pentyl | 171–172 | $n_D^{20}$ 1.5526 | $C_{13}H_{18}N_2O_5$ | 10.2 | 9.9 |
| 1-n-propyl-n-pentyl | 179.5–181 | $n_D^{20}$ 1.5482 | $C_{14}H_{20}N_2O_5$ | 9.25 | 9.46 |
| 1-n-butyl-n-pentyl | 184–185 | $n_D^{20}$ 1.5435 | $C_{15}H_{22}N_2O_5$ | 8.4 | 9.03 |
| 1-ethyl-n-hexyl | 164–166 | $n_D^{20}$ 1.5464 | $C_{14}H_{20}N_2O_5$ | 9.88 | 9.46 |
| 1-n-propyl-n-hexyl | 165–166 | $n_D^{20}$ 1.5424 | $C_{15}H_{22}N_2O_5$ | 8.95 | 9.03 |
| 1-n-butyl-n-hexyl | 180–182 | $n_D^{20}$ 1.5382 | $C_{16}H_{24}N_2O_5$ | 8.95 | 8.64 |
| 1-n-pentyl-n-hexyl | 183–184 | $n_D^{20}$ 1.5345 | $C_{17}H_{26}N_2O_5$ | 8.22 | 8.30 |

*Recrystallised from aqueous isopropanol.

C Preparation of Esters

The esters were all prepared from the corresponding 2,6-dinitro-4-alkyl phenols using the general method given below for 2,6-dinitro-4-(1-ethyl-n-hexyl)phenyl acrylate (i.e. the compound of Example 15.

PREPARATION OF 2,6-Dinitro-4-(1-ethyl-n-hexyl)phenyl acrylate 2,6-Dinitro-4-(1-ethyl-n-hexyl)phenol (4.5 g.) was dissolved in acetone (10 ml.) and potassium carbonate (1.1 g.) was added to the solution. The mixture was then refluxed for one-half hr. The resulting solution was cooled to 0° to 5°C. and acrylyl chloride (1.4 g.) in solution in acetone (10 ml.) added dropwise over a period of 7 minutes. The mixture was allowed to stand for one-half hr. and then refluxed for 2 hours. The mixture was then cooled and the precipitated solid filtered off. The solvent was removed from the filtrate under reduced pressure. The residue was dissolved in 25 ml. petroleum-ether (b.p. 60°–80°C) and the resulting solution shaken with 2N sodium carbonate (25 ml.) until there was no longer a red layer present at the solvent interface. The petroleum-ether solution was separated and washed with a 5 percent solution of sodium chloride (25 ml.) The petroleum-ether solution was dried over sodium sulphate, filtered and the solvent removed under reduced pressure (2 mm.), 2,6-Dinitro-4-(1-ethyl-n-hexyl)phenyl acrylate was obtained as a pale brown oil (3.6 g.).

The physical data of the crotonyl esters of the Examples are given in Table III. In Table III the groups $R^3$ and $R^4$ refer to the substitutents in the general formula

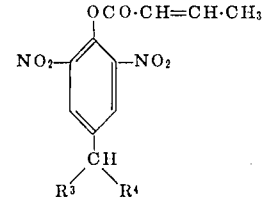

VI $R^3$ and $R^4$ being normal alkyl groups. The esters were oils ranging from pale yellow to red brown in color.

TABLE III

| Ex. No. | $R^3$ | $R^4$ | Refractive index ($n_D^{20}$) | Empirical Formula | Analysis Found N(%) | required N(%) |
|---|---|---|---|---|---|---|
| 1 | $C_3H_7$ | $C_3H_7$ | 1.5310 | $C_{17}H_{22}N_2O_6$ | 7.33 | 8.0 |
| 2 | $C_3H_7$ | $C_5H_{11}$ | 1.5240 | $C_{19}H_{26}N_2O_6$ | 7.30 | 7.41 |
| 3 | $C_4H_9$ | $C_5H_{11}$ | 1.5211 | $C_{20}H_{28}N_2O_6$ | 7.20 | 7.14 |
| 4 | $C_5H_{11}$ | $C_5H_{11}$ | 1.5198 | $C_{21}H_{30}N_2O_6$ |  | 6.9 |
| 5 | $C_2H_5$ | $C_6H_9$ | 1.5236 | $C_{17}H_{22}N_2O_6$ | 7.74 | 8.00 |
| 6 | $C_3H_7$ | $C_6H_9$ | 1.5272 | $C_{18}H_{24}N_2O_6$ | 7.31 | 7.69 |
| 7 | $C_4H_9$ | $C_6H_9$ | 1.5210 | $C_{19}H_{26}N_2O_6$ | 7.32 | 7.4 |

The physical data of three esters of 4(1-n-propyl-n-pentyl)-2,6-dinitrophenol which were prepared are given below in Table IV (with reference to the group R in Formula I).

TABLE IV

| Ex. No. | R | Refractive Index ($n_D^{20}$) | Empirical Formula | Analysis Found N(%) | Required N(%) |
|---|---|---|---|---|---|
| 8 | $CH_3$ | [m.p. 60°-62°C] | $C_{16}H_{22}N_2O_6$ | 8.9 | 8.3 |
| 9 | $C(CH_3)=CH_2$ | 1.5242 | $C_{18}H_{24}N_2O_6$ | 7.3 | 7.7 |
| 10 | $CH(CH_3)_2$ | 1.5098 | $C_{18}H_{26}N_2O_6$ | 7.6 | 7.65 |

The physical data of various esters of 4-(1-ethyl-n-hexyl)-2,6-dinitrophenol which were prepared are given below in Table V again with reference to the group R in Formula I. The esters of both Table IV above and Table V below were oils ranging in color from pale yellow to red brown at about 20°C except where otherwise stated.

TABLE V

| Ex. No. | R | Refractive index ($n_D^{20}$) | Empirical Formula | Analyses found N(%) | required N(%) |
|---|---|---|---|---|---|
| 11 | $CH_3$ | m.p. 51.5–53.5°C yellow crystals | $C_{16}H_{22}N_2O_6$ | 8.5 | 8.3 |
| 12 | $C_2H_5$ | 1.5096 | $C_{17}H_{24}N_2O_6$ | | |
| 13 | $C_3H_7$ | 1.5110 | $C_{18}H_{26}N_2O_6$ | | 7.6 |
| 14 | $CH(CH_3)_2$ | 1.5073 ($n_D^{29}$) | $C_{18}H_{26}N_2O_6$ | 7.7 | 7.6 |
| 15 | $CH=CH_2$ | 1.5268 | $C_{17}H_{22}N_2O_6$ | 8.0 | 8.0 |
| 16 | $C(CH_3)=CH_2$ | m.p. 44°–45°C cream crystals | $C_{18}H_{24}N_2O_6$ | 7.5 | 7.7 |
| 17 | $CH=C(CH_3)_2$ | 1.5297 | $C_{19}H_{26}N_2O_6$ | 7.4 | 7.4 |
| 18 | $CH=CHCO_2Me$ | 1.5258 | $C_{19}H_{24}N_2O_8$ | 6.3 | 6.9 |
| 19 | $CH_2Cl$ | 1.5309 ($n_D^{18}$) | $C_{16}H_{21}ClN_2O_6$ | 8.0 | 7.5 |
| 20 | $CHClCH_3$ | 1.5202 | $C_{17}H_{23}ClN_2O_6$ | 7.0 | 7.2 |
| 21 | $CH_2CH_2Cl$ | 1.5243 | $C_{17}H_{23}ClN_2O_6$ | 6.9 Cl:9.6 | 7.2 9.2 |
| 22 | $C_6H_5$ | 1.5585 | $C_{21}H_{24}N_2O_6$ | 7.0 | 7.0 |
| 23 | $p\text{-}Cl.C_6H_4-$ | 1.5604 | $C_{21}H_{23}ClN_2O_6$ | 6.33 Cl:8.08 | 6.44 Cl:8.17 |

The esters of the invention display mildewicidal activity against at least one of apple and barley mildew. Moreover, the products of Example 11 and 15 had LD95 of 50 and 35 p.p.m. respectively against spores of *Venturia inaequalis*, the causative organism of apple scab. When tested on apple rootstocks they gave 99 percent control of apple scab at a concentration of 300 p.p.m. The methods of carrying out mildew tests on the compounds of he examples are given below.

As stated above the esters of the invention display mildewicidal activity. The results obtained in tests and the methods of testing are shown below.

The products were in all cases formulated using 25 g. of the active compound, 4 g. of calcium dodecyl benzene sulphonate, 4 g. of ethoxylated nonyl phenol and heavy naphtha to give 100 ml.

APPLE MILDEW ERADICANT TEST.

Apple rootstocks were kept in a cool greenhouse and allowed to become infected with apple mildew originating from infected rootstocks kept in the same house.

Before application of the toxicant dilution, the amount of mildew present on each rootstock was assessed by grading each leaf according to the percentage of the leaf area covered by apparently active mildew infection, the scale used being as follows:

Grade 0 no mildew present
Grade 1 0 – 3% of leaf area infected by mildew
Grade 2 4 – 7% of leaf area infected by mildew
Grade 3 8 – 17% of leaf area infected by mildew
Grade 4 18–41% of leaf area infected by mildew
Grade 5 42–100% of leaf area infected by mildew The mildew on the leaves was assessed up to a certain height of the apple rootstocks. A tag was placed above the uppermost leaf assessed to ensure that the same leaves would be assessed after treatment.

After assessment, the plants were divided up into four groups, to be considered as blocks in the experimental design, each group being as homogeneous as possible in respect of mildew infection of the plants. Within the groups a single plant fro each treatment was used, making a total of four replicate plants per treatment. Spraying was by high volume hand sprayer, sufficient spray being applied to ensure thorough coverage. The sprays were prepared by diluting the formulation to give 20 p.p.m. of the test compound in the spray. To ensure good wetting, sodium dioctyl sulphosuccinate was included at 100 p.p.m. After spraying, the plants were arranged in the cool greenhouse to form four randomized blocks.

Four days later the mildew infection was again assessed; only the area of active mildew was taken into account.

The mean grade per leaf for the four replicates was calculated and these grades were used for the statistical analysis.

Differences between means grades before treatment were not significantly great at the 5 percent level, so percentage control was calculated by comparing the mean grades per leaf (of the four replicates combined) for each treatment with the mean grade per leaf for the untreated rootstocks.

BARLEY MILDEW ERADICANT TEST

Pots containing 10 barley seedlings were kept in six groups, each group being considered as a block in the experimental design and containing one pot for each treatment. The seedlings were infected by blowing spores from infected plants over them, after all leaves except the oldest had been removed from each plant.

After the infection had developed sufficiently, the amount of mildew present was assessed by grading the leaves according to the scale given in the apple mildew test.

The plants were then treated by dipping for 15 seconds in a dilution containing the test compound at 20 p.p.m. and sodium dioctyl sulphosuccinate at 300 p.p.m.

After treatment the plants were kept in a cool greenhouse for 4 days, after which they were assessed using the same grades as previously. Active mildew only was assessed.

A mean grade per leaf was calculated for each replicate, and these grades were used for a statistical analysis. Since the difference between the mean grades before treatment were not significantly different at the 5 percent level, percentage control was calculated by comparing the mean grade per leaf (of the six replicates combined) with the mean grade per leaf of the untreated seedlings.

CUCUMBER MILDEW ERADICANT TEST

This followed the test described for apple mildew except that young cucumber plants with two leaves were used. The grading of mildew on the cucumber plants before infection was as follows:

Grade 0 - no mildew present
Grade 1 - 0.5% of leaf area infected by mildew
Grade 2 - 1% of leaf area infected by mildew
Grade 3 - 2% of leaf area infected by mildew
Grade 4 - 4% of leaf area infected by mildew
Grade 5 - 8% of leaf area infected by mildew
Grade 6 - 16% of leaf area infected by mildew
Grade 7 - 32% of leaf area infected by mildew
Grade 8 - ≥ 64% of leaf area infected by mildew
No wetting agent was added to the toxicant spray.
The following results were obtained:

| Compound of Example No. | Percentage eradication of mildew | | |
|---|---|---|---|
| | Apple 20 p.p.m. | Apple 10 p.p.m. | Barley 20 p.p.m. |
| 1 | | 91 | 95 |
| 2 | 99.8 | | |
| 3 | 99.5 | | |
| 4 | | 97 | |
| 5 | 100 | | |
| 6 | 99 | | 99+ |
| 7 | | 97 | |
| 11 | | | 95.8 |
| 14 | | | 98.5 |
| 15 | | | 99.8 |
| 16 | | | 98.8 |
| 17 | | | 94 |
| 20 | | | 98 |
| 21 | | | 98 |
| 22 | | | 96 |

We claim:
1. A compound of the formula

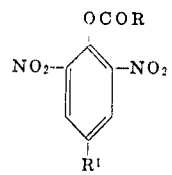

wherein R is selected from the group consisting of — $CH=CH_2$, —$CH=CHCH_3$, —$C(CH_3)=CH_2$, —$CH=C(CH_3)_2$, —$CH=CHCO_2CH_3$, —$CH_3$, —$CH_2CH_3$, —$CH_2CH_2CH_3$, —$CH(CH_3)_2$, —$CH_2Cl$, —$CHClCH_3$, —$CH_2CH_2Cl$,

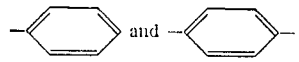

Cl and $R^1$ is selected from the group consisting of 1-ethyl-n-hexyl, 1-n-propyl-n-hexyl, 1-n-butyl-n-hexyl, 1-n-pentyl-n-hexyl, 1-ethyl-n-pentyl, 1-n-propyl-n-pentyl, 1-n-butyl-n-pentyl and 1-n-propyl-n-butyl, $R^1$ being other than 1-ethyl-n-hexyl when R is —$CH=CHCH_3$.

2. A compound as claimed in claim 1 in which R represents methyl or vinyl.
3. The compound of claim 1 which is 2,6-dinitro-4-(1-n-propyl-n-butyl) phenyl crotonate.
4. The compound of claim 1 which is 2,6-dinitro-4-(1-n-propyl-n-hexyl) phenyl crotonate.
5. The compound of claim 1 which is 2,6-dinitro-4-(1-n-butyl-n-hexyl) phenyl crotonate.
6. The compound of claim 1 which is 2,6-dinitro-4-(1-n-pentyl-n-hexyl) phenyl crotonate.
7. The compound of claim 1 which is 2,6-dinitro-4-(1-ethyl-n-pentyl) phenyl crotonate.
8. The compound of claim 1 which is 2,6-dinitro-4-(1-n-propyl-n-pentyl) phenyl crotonate.
9. The compound of claim 1 which is 2,6-dinitro-4-(1-n-butyl-n-pentyl) phenyl crotonate.
10. The compound of claim 1 which is 2,6-dinitro-4-(1-ethyl-n-hexyl) phenyl acetate.
11. The compound of claim 1 which is 2,6-dinitro-4-(1-ethyl-n-hexyl) phenyl acrylate.
12. The compound of claim 1 which is 2,6-dinitro-4-(1-ethyl-n-hexyl) phenyl α-methyl acrylate.
13. The compound of claim 1 which is 2,6-dinitro-4-(1-ethyl-n-hexyl) phenyl α-chloropropionate.

* * * * *